United States Patent
Park et al.

(10) Patent No.: US 8,638,756 B2
(45) Date of Patent: Jan. 28, 2014

(54) METHOD FOR SUPPORTING HIGH SPEED RANGING DURING HANDOVER

(75) Inventors: Jin-soo Park, Gyeonggi-do (KR);
Shinha Kang, Gyeonggi-do (KR);
Dohak Lee, Gyeonggi-do (KR);
Bongman Kim, Seoul (KR)

(73) Assignee: Intellectual Discovery Co., Ltd., Seoul (KR)

( * ) Notice: Subject to any disclaimer, the term of this patent is extended or adjusted under 35 U.S.C. 154(b) by 222 days.

(21) Appl. No.: 13/141,979

(22) PCT Filed: Dec. 23, 2009

(86) PCT No.: PCT/KR2009/007717
§ 371 (c)(1),
(2), (4) Date: Oct. 12, 2011

(87) PCT Pub. No.: WO2010/074505
PCT Pub. Date: Jul. 1, 2010

(65) Prior Publication Data
US 2012/0020327 A1   Jan. 26, 2012

(30) Foreign Application Priority Data
Dec. 23, 2008   (KR) ........................ 10-2008-0132685

(51) Int. Cl.
*H04W 4/00* (2009.01)
*H04W 36/00* (2009.01)

(52) U.S. Cl.
USPC ............................ 370/331; 455/436; 455/437

(58) Field of Classification Search
USPC ........................... 370/331–338; 455/436–440
See application file for complete search history.

(56) References Cited

U.S. PATENT DOCUMENTS

| | | | | |
|---|---|---|---|---|
| 2008/0146235 | A1* | 6/2008 | Kang et al. | 455/437 |
| 2009/0131056 | A1* | 5/2009 | Bontu et al. | 455/436 |
| 2009/0252116 | A1* | 10/2009 | von Brandt et al. | 370/331 |
| 2009/0290554 | A1* | 11/2009 | Siltala et al. | 370/331 |
| 2011/0281581 | A1* | 11/2011 | Brandt et al. | 455/427 |
| 2012/0021747 | A1* | 1/2012 | Brandt et al. | 455/437 |

FOREIGN PATENT DOCUMENTS

| | | |
|---|---|---|
| CN | 1794865 A | 6/2006 |
| CN | 101009926 A | 8/2007 |
| KR | 10-2008-0064426 | 7/2008 |
| KR | 10-2005-0081324 | 8/2008 |
| KR | 10-2008-0108209 | 12/2008 |

\* cited by examiner

*Primary Examiner* — Brandon Renner
(74) *Attorney, Agent, or Firm* — Sughrue Mion, PLLC

(57) ABSTRACT

Disclosed is a portable internet system, and more particularly, to a method of supporting fast ranging upon handover. The method comprises calculating an action time based on a time when a handover confirmation message is received from a serving Radio Access Station (RAS), in a target RAS; and transmitting a fast ranging information message to a mobile station on the basis of the action time.

5 Claims, 4 Drawing Sheets

METHOD FOR SUPPORTING HIGH SPEED RANGING DURING HANDOVER

TECHNICAL FIELD

The present invention relates to a portable Internet system, and more particularly, to a method of supporting fast ranging upon handover.

BACKGROUND ART

A portable Internet system based on Institute of Electrical and Electronics Engineers (IEEE) 802.16e standard uses a wide frequency bandwidth and thus transmits much data for a short time. Moreover, all users can efficiently use a channel by sharing the channel.

Data transmission/reception between a Mobile Station (MS) and a Radio Access Station (RAS) is performed by the Orthogonal Frequency Division Multiplexing (OFDM) scheme or the Orthogonal Frequency Division Multiple Access (OFDMA) scheme, and the mobility of the mobile station is supported by a multi-cell structure.

FIG. 1 is a diagram schematically illustrating a configuration of a portable Internet system.

Referring to FIG. 1, when a mobile station 110 moves from a cell area 130 of a serving RAS 120, to which service is being provided currently, to cell areas 131 and 132 of other RASs 121 and 122, a portable Internet system prevents service provided to the mobile station 110 from being stopped by performing handover.

In the portable Internet system, a mobile station performs cell reselection, handover decision and initiation, synchronization with a target RAS, and ranging, upon handover. Upon handover, a mobile station is required to transmit/receive information regarding handover to/from a serving RAS and a target RAS, and thus, delay occurs. Herein, transmission of fast ranging information message (hereinafter referred to as fast ranging IE) corresponds to a fast ranging operation for minimizing delay due to ranging, among operations associated with handover.

When a handover procedure defined in IEEE 802.16e standard is normally performed, fast ranging is capable of being performed. However, a mobile station decides handover, and thereafter arbitrarily decides handover initiation, or handover initiation can be delayed due to another cause. In this case, handover is performed between a mobile station and a target RAS after an action time, and thus, the mobile station cannot receive fast ranging IE transmitted by the target RAS. At this point, a fast ranging operation is not performed, causing the delay of handover.

Also, when a signal state of a serving RAS is rapidly changed or very bad during a handover decision and initiation operation, a mobile station cannot exchange a message with the serving RAS. In this case, a message transmitted/received between the mobile station and the serving RAS is omitted, causing the delay of handover.

Moreover, when the signal state of the serving RAS is well changed and thus handover is not required, handover is cancelled during the handover decision operation, and the mobile station can continuously communicate with the serving RAS. However, since an action time for the transmission of fast ranging IE is decided during the handover decision operation, the target RAS allocates fast ranging IE to the action time irrespective of a state between the mobile station and the serving RAS, and thus, a wireless resource can be wasted.

DETAILED DESCRIPTION OF THE INVENTION

Technical Problem

Accordingly, the present invention is directed to a method of supporting fast ranging upon handover, which reduces the causes of handover delay.

The present invention is also directed to a method of supporting fast ranging upon handover, which can prevent a wireless resource from being wasted.

Technical Solution

To achieve these and other advantages and in accordance with the purpose of the invention, as embodied and broadly described herein, there is provided a method of supporting fast ranging upon handover in a portable Internet system which includes: calculating an action time based on a time when a handover confirmation message is received from a serving Radio Access Station (RAS), in a target RAS; and transmitting a fast ranging information message to a mobile station on the basis of the action time.

In another aspect of the present invention, there is provided a method of supporting fast ranging upon handover in a portable Internet system which includes: transmitting a fast ranging information message from a target RAS to a mobile station, on the basis of a first action time which has been decided in a handover decision operation; calculating a second action time on the basis of a RAS switching time of the mobile station and a time when a handover confirmation message is received, in a case where the handover confirmation message based on a handover indication message of the mobile station is received from a serving RAS; and retransmitting the fast ranging information message to the mobile station on the basis of the second action time.

Advantageous Effect

The present invention provides a method of supporting fast ranging which can decrease the causes of handover delay when performing handover.

The present invention can support fast ranging to a mobile station even when the mobile station enters a target RAS after an action time and thereby cannot receive fast ranging IE.

The present invention can decrease a standby time of a ranging operation that is caused because a mobile station cannot receive fast ranging IE.

The present invention can decrease a standby time of a ranging operation that is caused because a serving RAS or a target RAS cannot receive handover information transmitted from a mobile station.

The present invention allows a mobile station to finally allocate fast ranging IE based on a time when handover is decided, thus decreasing a standby time of a ranging operation.

The present invention can prevent the waste of a wireless resource and the delay in a ranging operation that are caused because a control message for handover has been lost and an action time has elapsed, and thereafter, a mobile station enters a target RAS and thereby cannot receive fast ranging IE.

MODE FOR THE INVENTION

Hereinafter, a method of supporting fast ranging upon handover, according to an embodiment of the present invention, will be described in detail with reference to the accompanying drawings.

Before a description that will be made with reference to the accompanying drawings, a handover-related operation that is not described in the present invention and content of a message transmitted/received between a mobile station and a RAS may reference IEEE 802.16e document and WiMAX Forum Network Working Group (NWG) Stage-3 document that are technical standards of a wideband wireless access system.

Figure 1:
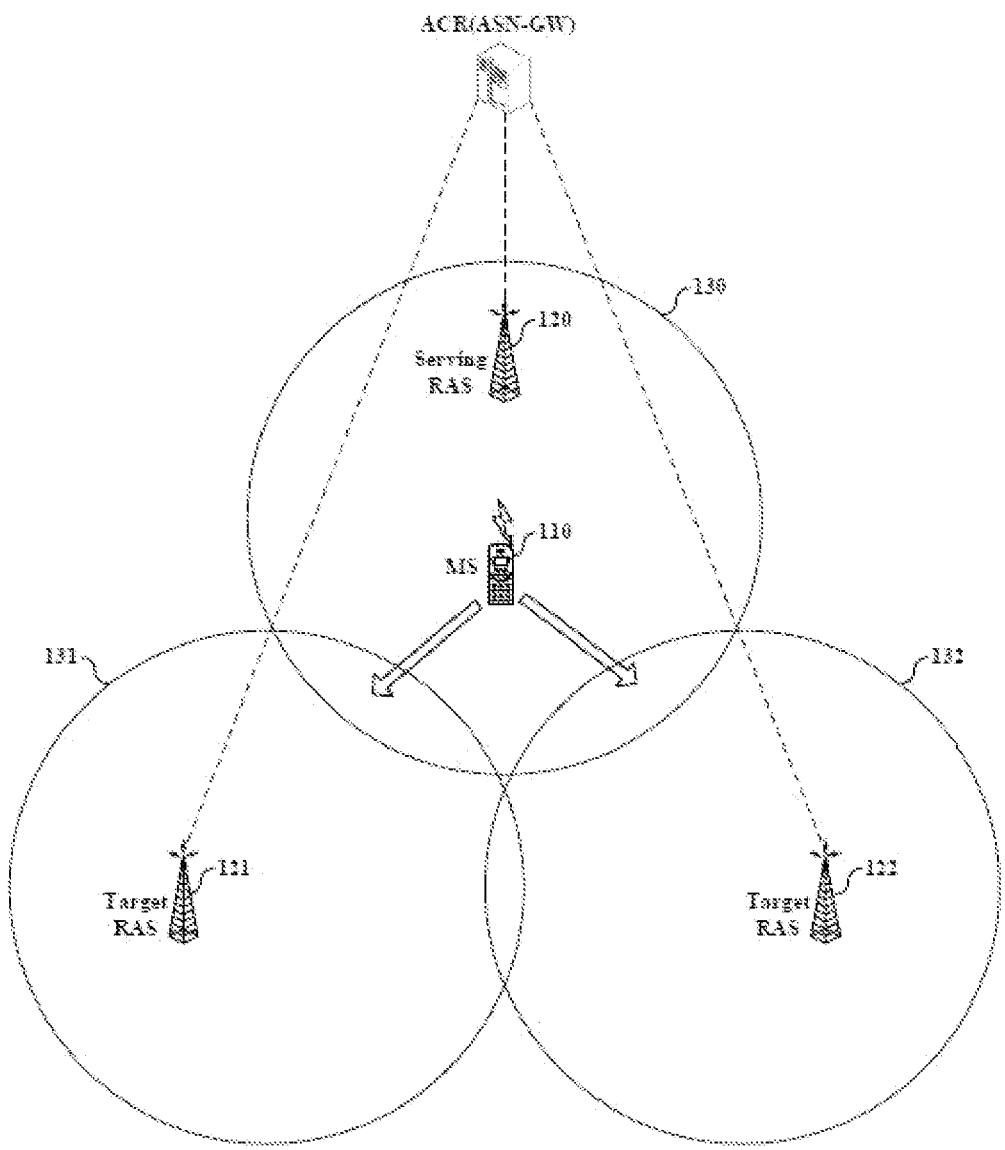
FIG. 1 is a diagram schematically illustrating a configuration of a portable Internet system.

Since a portable Internet system considers the mobility of a mobile station (MS), as illustrated in FIG. 1, a mobile station 110 maintains service provided through handover when the mobile station 110 enters from a cell area 130 of a serving RAS 120, which is currently providing service to the mobile station 110, into a cell area of an adjacent RAS.

To perform handover, a control message for handover is transmitted and received between the mobile station 110 and the serving RAS 120, and then the mobile station 110 decides a target RAS from among RASs 121 and 122 adjacent thereto. Furthermore, the target RAS sets an action time and notifies the mobile station 110 of the action time. Subsequently, at the action time, the mobile station 110 receives fast ranging IE from the target RAS to perform a ranging operation between the mobile station 110 and the target RAS.

The present invention provides a method of supporting fast ranging upon handover that can prevent the waste of a wireless resource and the delay in a ranging operation that are caused because a control message for handover has been lost and a mobile station performs handover to a target RAS after an action time due to the delay of handover decision by the mobile station and thereby cannot receive fast ranging IE.

The method of supporting fast ranging upon handover, according to an embodiment of the present invention, recalculates an action time based on a time when a mobile station has finally decided handover in a case where the control message for handover has been lost and the mobile station enters after a target RAS the action time and thereby cannot receive fast ranging IE. Furthermore, the method transmits fast ranging IE from the target RAS to the mobile station based on the recalculated action time, thereby enabling the mobile station to perform fast ranging.

Moreover, the present invention considers a case where handover information (control) message is lost while being transmitted although a mobile station has actually decided handover and transmitted the handover information (control) message to a serving RAS. For this end, by transmitting fast ranging IE from the target RAS to the mobile station based on an initially-set action time, the present invention enables the mobile station to perform fast ranging.

Figure 2:
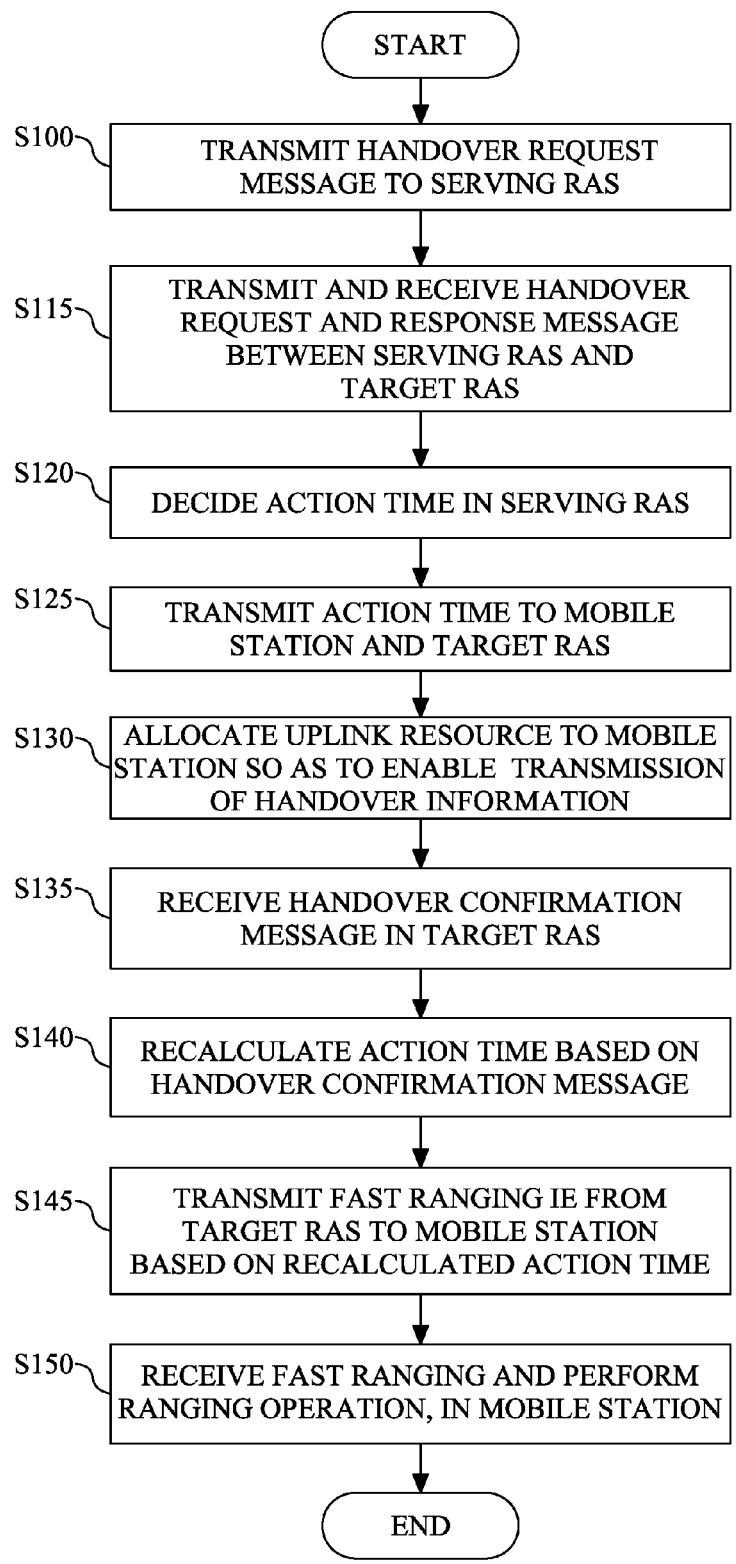
FIG. 2 is a flowchart illustrating a method of supporting fast ranging upon handover, according to an embodiment of the present invention.

FIG. 2 is a flowchart illustrating a method of supporting fast ranging upon handover, according to an embodiment of the present invention.

Referring to FIG. 2, when a mobile station enters from a cell area of a serving RAS, which is currently providing service to the mobile station, into a cell area of an adjacent RAS, the mobile station decides a target RAS for performing handover from among a plurality of adjacent RASs. For this end, the mobile station transmits a handover request (hereinafter referred to as MOB_MSHO-REQ) message, including information "NBR RAS List" of the adjacent RASs, to a serving RAS in operation S110.

When the MOB_MSHO-REQ message is received from the mobile station, the serving RAS decides the target RAS from among the adjacent RASs. An HO_Req message and an HO_Rsp message are transmitted and received between the serving RAS and the target RAS over a backbone network, and thus, a handover preparation operation is performed in operation S115. At this point, the serving RAS sets an action time based on a time when fast ranging IE for fast ranging is transmitted, by using information from the serving RAS and information from the mobile station in operation S120.

Subsequently, the serving RAS transmits a handover response (hereinafter referred to as MOB_MSHO-RSP) message to the mobile station to notify the mobile station of the set action time. That is, the serving RAS notifies the mobile station of a time when the fast ranging IE is transmitted. Also, the serving RAS transmits an HO_Ack message to the target RAS in response to the HO_Rsp message to notify the target RAS of the set action time in operation S125. Herein, the MOB_MSHO-RSP message is a response message for the MOB_MSHO-REQ message received from the mobile station 110, and includes action time information and candidate RAS information. The action time is for synchronizing a handover execution time between the mobile station and the target RAS. For example, when the action time is 10, this denotes that the mobile station may receive a signal transmitted from the target RAS, after 10 frames from the present.

The serving RAS allocates an uplink (UL) resource to the mobile station such that the mobile station transmits handover information in operation S130.

The mobile station transmits a handover indication (hereinafter referred to as MOB_HO-IND) message to the serving RAS by using the allocated uplink resource.

The serving RAS receives the MOB_HO-IND message, including handover information such as a handover mode, a handover type, and a target RAS identifier (Target RAS ID), from the mobile station. The serving RAS transmits a handover confirmation (hereinafter referred to as HO_Cnf) message to the target RAS on the basis of the MOB_HO-IND message. Herein, the MOB_HO-IND message includes information of a target RAS to which the mobile station intends to perform handover. The HO_Cnf message transmitted from the serving RAS to the target RAS includes handover approval information, time information (Timestamp) regarding a time when the HO_Cnf message has been transmitted from the serving RAS, and RAS switching time (BS Switching Time) information of the mobile station.

The mobile station transmits the MOB_HO-IND message to the serving RAS, and thereafter performs RAS switching (BS switching) to receive a signal (for example, the HO_Cnf message) from the target RAS.

The serving RAS receiving the MOB_HO-IND message from the mobile station transmits the HO_Cnf message to the target RAS on the basis of the received MOB_HO-IND message.

When the target RAS receives the HO_Cnf message from the serving RAS in operation S135, the target RAS recalculates an action time on the basis of the received HO_Cnf message in operation S140.

Herein, the recalculation of the action time is expressed as Equation (1) below.

$$\text{Action time} = \text{RAS switching time} - \text{handover information message transmission run-time} \quad (1)$$

where RAS switching time (BS Switching Timer) denotes a time (frame) that is taken in switching to the target RAS after the mobile station transmits the MOB_HO-IND message to the serving RAS. For example, when RAS switching is performed at the same frequency, the RAS switching time (BS Switching Timer) may be set as two frames (2 frame). On the other hand, when RAS switching is performed at different frequencies, the RAS switching time (BS Switching Timer) may be set as three frames (3 frame).

The handover information (control) message transmission run-time is a value that is obtained by subtracting a time (Current Timestamp) when the mobile station has transmitted the MOB_HO-IND message to the serving RAS, from a time when the target RAS has received the HO_Cnf message. The handover information (control) message transmission run-time denotes backbone network delay that is taken in transmitting and receiving the HO_Cnf message between the serving RAS and the target RAS.

Subsequently, the target RAS transmits the fast ranging IE to the mobile station on the basis of the recalculated action time in order for the mobile station to perform fast ranging upon handover in operation S145. Herein, a time for transmitting the fast ranging IE to the mobile station may be extended from the action time to a T55 time.

The mobile station has received the fast ranging IE, and thereafter a ranging operation is performed by transmitting and receiving a ranging request (hereinafter referred to as RNG-REQ) message and a ranging response (hereinafter referred to as RNG-RSP) message between the mobile station and the target RAS in operation S150. The mobile station performing handover can perform fast ranging through operations S110 to S150.

The above-described method of supporting fast ranging upon handover, according to an embodiment of the present invention, may allow a mobile station to perform fast ranging when handover information (control) message is lost while being transmitted or the mobile station enters a target station after an initially-set action time. For this end, the method recalculates an action time based on a time when the mobile station has finally decided handover. Furthermore, by transmitting fast ranging IE from the target RAS to the mobile station based on the recalculated action time, the present invention supports fast ranging of the mobile station. Accordingly, the present invention can prevent the waste of a wireless resource and the delay in a ranging operation.

Figure 3:
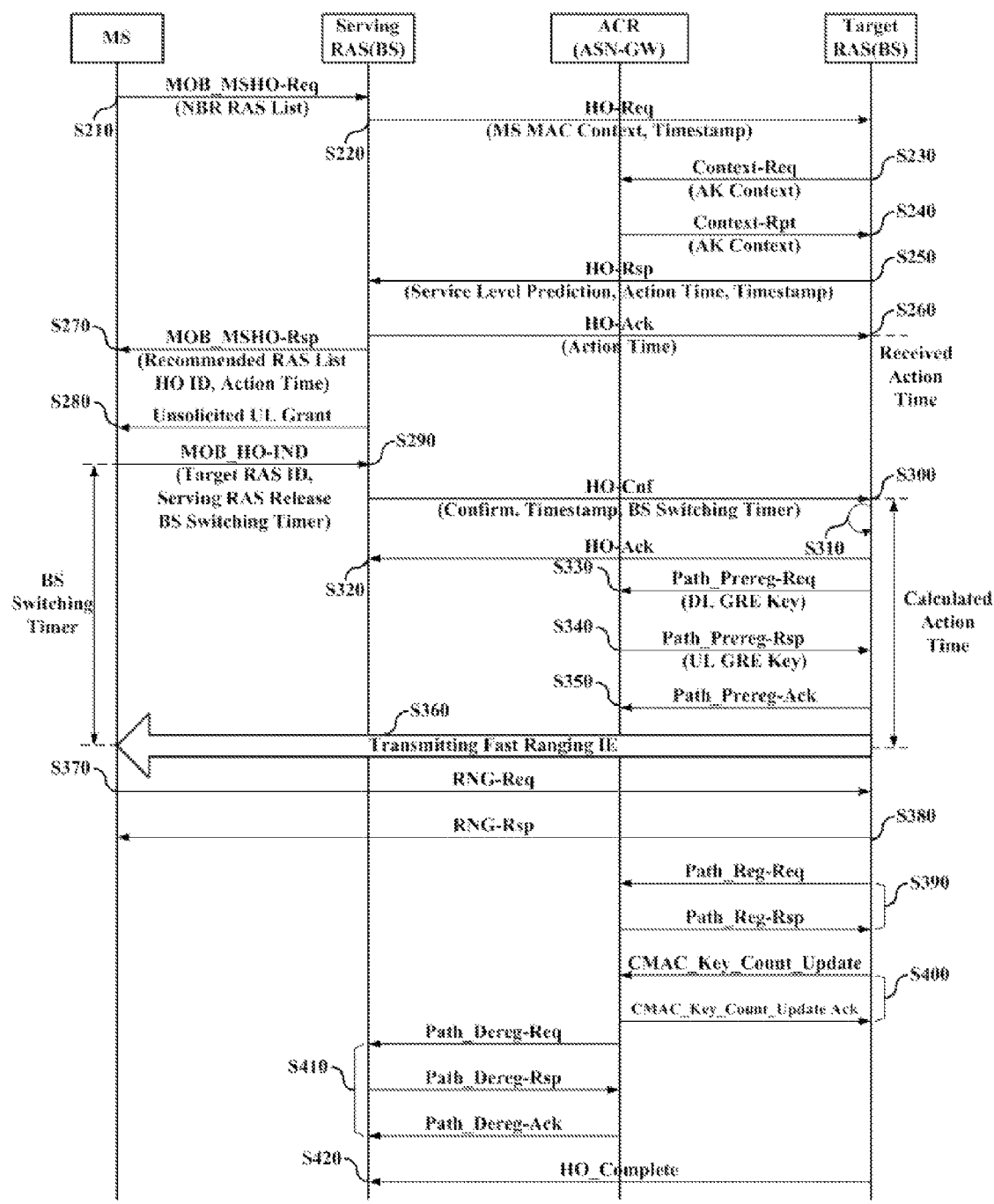
FIG. 3 is a flowchart illustrating a specific embodiment of a method of supporting fast ranging upon handover, according to the present invention.

Hereinafter, a specific embodiment of the method of supporting fast ranging upon handover according to the present invention will be described with reference to FIG. 3.

When a mobile station enters from a cell area of a serving RAS, which is currently providing service to the mobile station, into a cell area of an adjacent RAS, the mobile station decides a target RAS for performing handover from among a plurality of adjacent RASs. For this end, the mobile station transmits an MOB_MSHO-REQ message, including information "NBR RAS List" of the adjacent RASs, to a serving RAS in operation S210.

When the MOB_MSHO-REQ message is received from the mobile station, the serving RAS decides the target RAS from among the adjacent RASs. The serving RAS transmits an HO_Req message to the target RAS over a backbone network in operation S220.

The target RAS receiving the HO_Req message from the serving RAS requests an authentication key by transmitting a Context_Req message to an Access Control Router (ACR) in operation S230. The access control router receiving the Context_Req message from the target RAS gives the authentication key by transmitting the Context_Rpt message to the target RAS in response to the received message in operation S240.

Subsequently, the target RAS transmits an HO_Rsp message to the serving RAS in response to the HO_Req message received from the serving RAS in operation S250. Herein, the HO_Req message includes service level prediction information, target RAS's action time information, and a time stamp (Timestamp).

The serving RAS sets an action time based on a time when fast ranging IE for fast ranging is transmitted, on the basis the action time information received from the target RAS. Furthermore, the serving RAS transmits an HO_Ack message including the action time to the target RAS in operation S260.

Herewith, in response to the MOB_MSHO-REQ message that has been received in operation S210, the serving RAS transmits an MOB_MSHO-RSP message to the mobile station to notify the mobile station of the set action time in operation S270. Herein, the MOB_MSHO-RSP message transmitted to the mobile station includes the action time, information "Recommended RAS List" regarding candidate RASs suitable as a target RAS among adjacent RASs, and a handover ID (HO ID) of each candidate RAS.

The serving RAS allocates an uplink wireless resource to the mobile station in order for the mobile station to transmitting the MOB_HO-IND message in operation S280.

The mobile station decides a target RAS for handover, and then transmits the MOB_HO-IND message, including target RAS information (Target RAS ID), a handover mode, and a handover type, to the serving RAS in operation S290.

In this case, the mobile station transmits the MOB_HO-IND message to the serving RAS and then performs RAS switching, thereby enabling the serving RAS to receive a signal transmitted from the target RAS. A time necessary for RAS switching is decided by a RAS switching timer (BS Switching Timer) of which the mobile station has notified the serving RAS in an initial access operation. When the mobile station does not notify the serving RAS of the RAS switching timer, a predetermined basic value is used. For example, when RAS switching is performed at the same frequency, the RAS switching timer may be set as two frames (2 frame). On the other hand, when RAS switching is performed at different frequencies, the RAS switching timer may be set as three frames (3 frame).

The serving RAS has received the MOB_HO-IND message from the mobile station, and then transmits an HO_Cnf message, including time (BS Switching Timer) information necessary for RAS switching by the mobile station, to the target RAS in operation S300. Herein, the HO_Cnf message includes time information (Timestamp) regarding a time when the serving RAS has transmitted the HO_Cnf message.

When the HO_Cnf message is received from the serving RAS, the target RAS supports fast ranging to the mobile station that has performed RAS switching. For this end, as in Equation (1), the target RAS recalculates an action time in consideration of a RAS switching time and a time (backbone network delay) taken in transmitting the HO_Cnf message, on the basis of handover information included in the HO_Cnf message in operation S310.

Subsequently, the target RAS transmits an HO_Ack message to the serving RAS in response to the received HO_Cnf message in operation S320.

Herewith, the target RAS requests data path reservation by transmitting a data path reservation request (hereinafter referred to as Path_Prereg_Req) message to the access control router over a backbone network in operation S330. The access control router receiving the Path_Prereg_Req message from the target RAS transmits a data path reservation response (hereinafter referred to as Path_Prereg_Rsp) message to the target RAS in response to the Path_Prereg_Req message in operation S340. Subsequently, the target RAS transmits a Path_Prereg_Ack message to the access control router to notify that the Path_Prereg_Rsp message has been received in operation S350.

When an action time is recalculated on the basis of the HO_Cnf message that has been received in operation S310, the target RAS transmits fast ranging IE to the mobile station on the basis of the recalculated action time in operation S360.

Herein, the recalculated action time is calculated based on a time when the mobile station has finally decided handover. The mobile station transmits the MOB_HO-IND message, performs RAS switching, and changes a physical layer so as to receive a signal transmitted from the target RAS. Therefore, the mobile station can receive fast ranging IE transmitted from the target RAS, on the basis of the recalculated action time.

Accordingly, when the mobile station receives the fast ranging IE transmitted from the target RAS, the ranging operation is performed between the mobile station and the target RAS. First, the mobile station transmits an RNG-REQ message to the target RAS, for receiving the allocation of the uplink resource by using the fast ranging IE received from the target RAS in operation S370. Subsequently, the target RAS transmits an RNG-RSP message to the mobile station in response to the RNG-REQ message received from the mobile station in operation S380.

Subsequently, a data path is formed by transmitting and receiving a Path_Reg_Req message and Path_Reg_Rsp message between the target RAS and the access control router in operation S390. A Cipher-base Message Authentication Code (CMAC) key count value is updated by transmitting and receiving a CMAC_Key_Count_Update message and CMAC_Key_Count_Update_Ack message between the target RAS and the access control router in operation S400.

Furthermore, by transmitting and receiving a Path_Dereg_Req message, Path_Dereg_Rsp message, and Path_Dereg_Ack message between the serving RAS and the access control router, a data path set between the serving RAS and the access control router is removed in operation S410.

The mobile station performs fast ranging through operations S210 to S410, and thus completes handover (HO_Complete) in operation S420.

The above-described method of supporting fast ranging upon handover, according to an embodiment of the present invention, recalculates an action time based on a time when the mobile station has finally decided handover. Furthermore, by transmitting fast ranging IE from the target RAS to the mobile station based on the recalculated action time, the method supports fast ranging of the mobile station. Accordingly, the method can prevent the waste of a wireless resource and the delay in a ranging operation.

Figure 4:
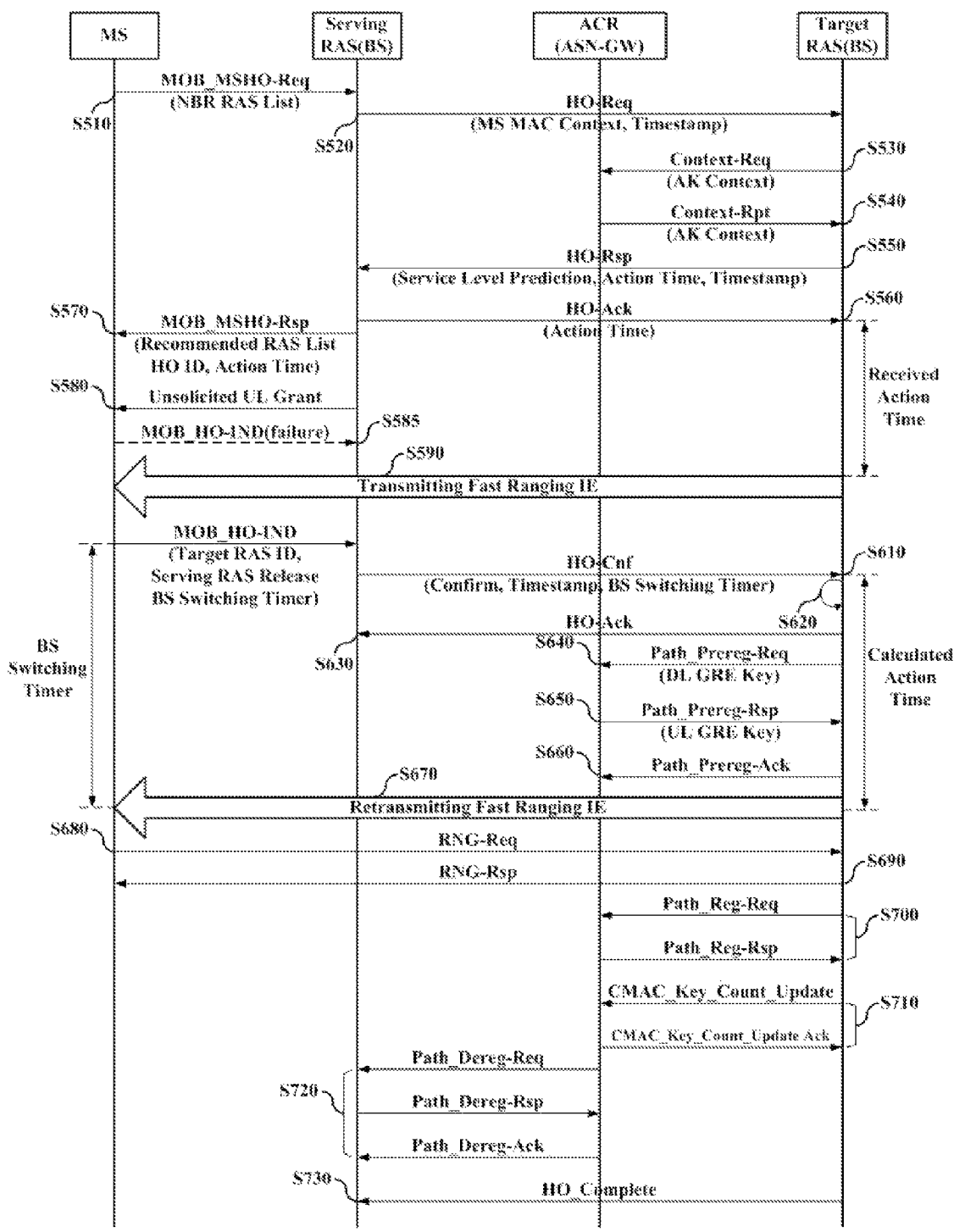
FIG. 4 is a flowchart illustrating another specific embodiment of a method of supporting fast ranging upon handover, according to the present invention.

FIG. 4 is a flowchart illustrating another specific embodiment of a method of supporting fast ranging upon handover, according to the present invention. Hereinafter, the other specific embodiment of a method of supporting fast ranging upon handover, according to the present invention, will be described with reference to FIG. 4.

When a mobile station enters from a cell area of a serving RAS, which is currently providing service to the mobile station, into a cell area of an adjacent RAS, the mobile station decides a target RAS for performing handover from among a plurality of adjacent RASs. For this end, the mobile station transmits an MOB_MSHO-REQ message, including information "NBR RAS List" of the adjacent RASs, to a serving RAS in operation S510.

When the MOB_MSHO-REQ message is received from the mobile station, the serving RAS decides the target RAS from among the adjacent RASs. The serving RAS transmits an HO_Req message to the target RAS over a backbone network in operation S520.

The target RAS receiving the HO_Req message from the serving RAS requests an authentication key by transmitting a Context_Req message to an Access Control Router (ACR) in operation S530. The access control router receiving the Context_Req message from the target RAS gives the authentication key by transmitting the Context_Rpt message to the target RAS in response to the received message in operation S540.

Subsequently, the target RAS transmits an HO_Rsp message to the serving RAS in response to the HO_Req message received from the serving RAS in operation S550. Herein, the HO_Req message includes service level prediction information, target RAS's action time information, and a time stamp (Timestamp).

The serving RAS sets an action time based on a time when fast ranging IE for fast ranging is transmitted, on the basis the action time information received from the target RAS. Furthermore, the serving RAS transmits an HO_Ack message including the action time to the target RAS in operation S560.

Herewith, in response to the MOB_MSHO-REQ message that has been received in operation S510, the serving RAS transmits an MOB_MSHO-RSP message to the mobile station to notify the mobile station of the set action time in operation S570. Herein, the MOB_MSHO-RSP message transmitted to the mobile station includes the action time, information "Recommended RAS List" regarding candidate RASs suitable as a target RAS among adjacent RASs, and a handover ID (HO ID) of each candidate RAS.

The serving RAS allocates an uplink wireless resource to the mobile station in order for the mobile station to receive the MOB_HO-IND message in operation S580.

The mobile station finally decides handover, and then transmits the MOB_HO-IND message, which includes target RAS information (Target RAS ID), a handover mode, and a handover type, to the serving RAS with the uplink wireless resource allocated by the serving RAS.

Herein, when delay occurs in deciding handover of the mobile station or a handover-related message transmitted and received between a mobile station and a RAS is lost while being transmitted, it becomes difficult to perform fast ranging. The method of supporting fast ranging upon handover, according to another embodiment of the present invention, enables fast ranging even when the decision of handover is delayed and/or a handover-related message is lost while being transmitted.

For example, when the mobile station decides a target RAS for handover, and then the MOB_HO-IND message which includes target RAS information (Target RAS ID), a handover mode, and a handover type may be lost while being transmitted in operation S585.

The mobile station transmits the MOB_HO-IND message to the serving RAS, and then performs RAS switching to receive a signal transmitted from the target RAS. Accordingly, when fast ranging IE is received from the target RAS at the action time, fast ranging may be performed.

In consideration of such a case, even when the handover-related message is lost, the target RAS transmits the fast ranging IE to the mobile station in order for the mobile station to perform fast ranging, on the basis of the action time that has been received from the serving RAS in operation S560. Herein, the fast ranging IE may be transmitted to the mobile station for from the action time to the maximum +T55 time S590.

Delay occurs in deciding handover of the mobile station, and thus, the mobile station decides a target RAS for handover after the action time. Subsequently, the MOB_HO-IND message which includes target RAS information (Target RAS ID), a handover mode, and a handover type may be transmitted to the serving RAS in operation S600. At this point, the mobile station transmits the MOB_HO-IND message to the serving RAS, and then performs RAS switching to receive a signal transmitted from the target RAS.

A time necessary for RAS switching of the mobile station is decided by a RAS switching timer (BS Switching Timer) of which the mobile station has notified the serving RAS in an initial access operation. When the mobile station does not notify the serving RAS of the RAS switching timer, a predetermined basic value is used. For example, when RAS switching is performed at the same frequency, the predetermined basic value may be set as two frames (2 frame). On the other hand, when RAS switching is performed at different frequencies, the predetermined basic value may be set as three frames (3 frame).

The serving RAS has received the MOB_HO-IND message from the mobile station, and then transmits an HO_Cnf message, including time (BS Switching Timer) information necessary for RAS switching by the mobile station, to the target RAS in operation S610. Herein, the HO_Cnf message includes time information (Timestamp) regarding a time when the serving RAS has transmitted the HO_Cnf message.

When the HO_Cnf message is received from the serving RAS, the target RAS supports fast ranging to the mobile station that has performed RAS switching. For this end, as in Equation (1), the target RAS recalculates an action time in consideration of a RAS switching time and a time (backbone network delay) taken in transmitting the HO_Cnf message, on the basis of handover information included in the HO_Cnf message in operation S620.

Subsequently, the target RAS transmits an HO_Ack message to the serving RAS in response to the received HO_Cnf message in operation S630.

Herewith, the target RAS requests data path reservation by transmitting a Path_Prereg_Req message to the access control router over a backbone network in operation S640. The access control router receiving the Path_Prereg_Req message from the target RAS transmits a Path_Prereg_Rsp message to the target RAS in response to the Path_Prereg_Req message in operation S650. Subsequently, the target RAS transmits a Path_Prereg_Ack message to the access control router to notify that the Path_Prereg_Rsp message has been received in operation S660.

When an action time is recalculated on the basis of the HO_Cnf message that has been received in operation S620, the target RAS retransmits fast ranging IE to the mobile station on the basis of the recalculated action time in operation S670.

Herein, the recalculated action time is calculated based on a time when the mobile station has finally decided handover. The mobile station transmits the MOB_HO-IND message, performs RAS switching, and changes a physical layer so as to receive a signal transmitted from the target RAS. Subsequently, the mobile station may receive fast ranging IE transmitted from the target RAS, on the basis of the recalculated action time.

Accordingly, when the mobile station receives the fast ranging IE transmitted from the target RAS, the ranging operation is performed between the mobile station and the target RAS. First, the mobile station transmits an RNG-REQ message to the target RAS, for receiving the allocation of the uplink resource by using the fast ranging IE received from the target RAS in operation S680. Subsequently, the target RAS transmits an RNG-RSP message to the mobile station in response to the RNG-REQ message received from the mobile station in operation S690.

Subsequently, a data path is formed by transmitting and receiving a Path_Reg_Req message and Path_Reg_Rsp message between the target RAS and the access control router in operation S700. A CMAC key count value is updated by transmitting and receiving a CMAC_Key_Count_Update message and CMAC_Key_Count_Update_Ack message between the target RAS and the access control router in operation S710.

Furthermore, by transmitting and receiving a Path_Dereg_Req message, Path_Dereg_Rsp message, and Path_Dereg_Ack message between the serving RAS and the access control router, a data path set between the serving RAS and the access control router is removed in operation S720.

The mobile station performs fast ranging through operations S510 to S720, and thus completes handover (HO_Complete) in operation S730.

The above-described method of supporting fast ranging upon handover, according to another embodiment of the present invention, enables fast ranging even when delay occurs in deciding handover of a mobile station or a handover-related message transmitted and received between the mobile station and a RAS is lost while being transmitted. Accordingly, the method can prevent the waste of a wireless resource and the delay in a ranging operation.

It will be apparent to those skilled in the art that various modifications and variations can be made in the present invention without departing from the spirit or scope of the inventions.

Thus, it is intended that the present invention covers the modifications and variations of this invention provided they come within the scope of the appended claims and their equivalents.

What is claimed is:

1. A method of supporting fast ranging upon handover, in a portable Internet system, the method comprising:
   transmitting a fast ranging information message from a target Radio Access Station (RAS) to a mobile station, on the basis of a first action time which has been decided in a handover decision operation;
   calculating a second action time on the basis of a RAS switching time of the mobile station and a time when a handover confirmation message is received, in a case where the handover confirmation message based on a handover indication message of the mobile station is received from a serving RAS; and
   retransmitting the fast ranging information message to the mobile station on the basis of the second action time.

2. The method according to claim 1, wherein the handover indication message comprises handover information which comprises a handover mode, a handover type, and a target RAS identifier (ID).

3. The method according to claim 1, wherein the second action time is calculated on the basis of a time taken in transmitting the handover confirmation message and a RAS switching time of the mobile station comprised in the handover confirmation message.

4. The method according to claim 1, further comprising:
receiving, by the mobile station, a fast ranging information message which is transmitted with the first action time; and
performing a ranging operation between the mobile station and the target RAS.

5. The method according to claim 1, further comprising:
transmitting, by the mobile station, the handover indication message, and performing switching to the target RAS to receive a fast ranging information message which is transmitted with the second action time; and
performing a ranging operation between the mobile station and the target RAS.

* * * * *